United States Patent
Wong et al.

(10) Patent No.: US 11,433,812 B2
(45) Date of Patent: Sep. 6, 2022

(54) HITCHING MANEUVER

(71) Applicant: Ford Global Technologies, LLC, Dearborn, MI (US)

(72) Inventors: Xue Iuan Wong, Dearborn, MI (US); Vidya Nariyambut murali, Sunnyvale, CA (US); Shannon Brooks-Lehnert, Ann Arbor, MI (US); Lihui Chen, Rochester, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 407 days.

(21) Appl. No.: 16/601,761

(22) Filed: Oct. 15, 2019

(65) Prior Publication Data
US 2020/0130582 A1    Apr. 30, 2020

Related U.S. Application Data

(60) Provisional application No. 62/751,948, filed on Oct. 29, 2018.

(51) Int. Cl.
*B60R 1/00* (2022.01)
*B62D 13/06* (2006.01)
(Continued)

(52) U.S. Cl.
CPC .............. *B60R 1/003* (2013.01); *B60D 1/26* (2013.01); *B60W 30/18036* (2013.01);
(Continued)

(58) Field of Classification Search
CPC .......... B60R 1/003; B60D 1/26; B60D 13/06; B60D 1/36; B60D 1/62; B60W 30/18036;
(Continued)

(56) References Cited

U.S. PATENT DOCUMENTS 7,195,267 B1 * 3/2007 Thompson ............... B60D 1/58
340/901
9,085,261 B2    7/2015 Lu et al.
(Continued)

FOREIGN PATENT DOCUMENTS

GB          2554427 A     4/2018

OTHER PUBLICATIONS

Atoum et al., "Monocular Video-Based Trailer Coupler Detection using Multiplexer Convolutional Neural Network", http://cvlab.cse.msu.edu/pdfs/ICCV2017_Coupler_system.pdf.

*Primary Examiner* — Sze-Hon Kong
(74) *Attorney, Agent, or Firm* — Frank A. MacKenzie; Bejin Bieneman PLC

(57) ABSTRACT

Upon initiation of trailer-hitching, an image is obtained of an area behind and in a horizontal plane with respect to a vehicle, the area including a rearwardly extending trailer hitch, with a hitch ball mounted thereto, mounted to the vehicle. The hitch ball is located in the image. An overshoot zone, having a length extending from a vehicle rear bumper to a nearest point on the vehicle hitch ball and having a width that is a sum of a diameter of the hitch and two times a lateral offset, is defined within the area, as is a misaligned zone having a border extending from the vehicle rear bumper to a line tangent to a rearmost point of the hitch ball. A vehicle action is caused upon determining that the trailer coupling is detected in the overshoot zone or the misaligned zone.

20 Claims, 8 Drawing Sheets

(51) Int. Cl.
  *B60D 1/26* (2006.01)
  *B60W 30/18* (2012.01)
  *B60W 50/14* (2020.01)

(52) U.S. Cl.
  CPC ....... *B62D 13/06* (2013.01); *B60W 2050/146* (2013.01); *B60W 2300/14* (2013.01); *B60W 2520/22* (2013.01)

(58) Field of Classification Search
  CPC ....... B60W 2050/146; B60W 2300/14; B60W 2520/22; B60W 10/18; B60W 10/06; B60W 10/20; B60W 50/00; B60W 2050/0043; B60W 2710/06; B60W 2710/18; B60W 2710/20; B62D 13/06; B62D 15/0285
  See application file for complete search history.

(56) References Cited

U.S. PATENT DOCUMENTS

| | | | |
|---|---|---|---|
| 9,696,723 B2 | 7/2017 | Zeng et al. | |
| 9,731,568 B2 | 8/2017 | Wuergler et al. | |
| 9,798,953 B2 | 10/2017 | Hu | |
| 9,914,333 B2* | 3/2018 | Shank | B62D 15/0285 |
| 2002/0149673 A1* | 10/2002 | Hirama | H04N 7/183 |
| | | | 348/E7.087 |
| 2010/0039515 A1* | 2/2010 | Dietz | B60R 1/003 |
| | | | 348/148 |
| 2010/0265048 A1* | 10/2010 | Lu | B60C 9/005 |
| | | | 340/435 |
| 2010/0324770 A1 | 12/2010 | Ramsey et al. | |
| 2011/0216199 A1* | 9/2011 | Trevino | H04N 7/183 |
| | | | 348/148 |
| 2013/0226390 A1* | 8/2013 | Luo | B60D 1/36 |
| | | | 348/148 |
| 2013/0321634 A1* | 12/2013 | Okano | B62D 15/0295 |
| | | | 348/148 |
| 2014/0012465 A1* | 1/2014 | Shank | B62D 15/0285 |
| | | | 701/36 |
| 2014/0125795 A1* | 5/2014 | Yerke | B60R 1/00 |
| | | | 348/118 |
| 2016/0023601 A1* | 1/2016 | Windeler | B62D 15/0275 |
| | | | 348/118 |
| 2016/0052548 A1 | 2/2016 | Singh et al. | |
| 2016/0375831 A1* | 12/2016 | Wang | G06F 3/048 |
| | | | 348/148 |
| 2017/0151846 A1* | 6/2017 | Wuergler | B62D 15/029 |
| 2017/0178328 A1* | 6/2017 | Hu | H04N 7/183 |
| 2018/0001721 A1* | 1/2018 | Hüger | G05D 1/0225 |
| 2018/0029429 A1 | 2/2018 | Janardhana | B60D 1/62 |
| 2018/0147900 A1* | 5/2018 | Shank | B60R 25/25 |
| 2018/0365509 A1* | 12/2018 | Naserian | B60R 1/003 |
| 2019/0283803 A1* | 9/2019 | Auner | G08G 1/168 |
| 2020/0223482 A1* | 7/2020 | Maruoka | B62D 15/029 |
| 2021/0235019 A1* | 7/2021 | Tonkin | G06T 7/70 |
| 2021/0339588 A1* | 11/2021 | Takahama | B60D 1/36 |

* cited by examiner

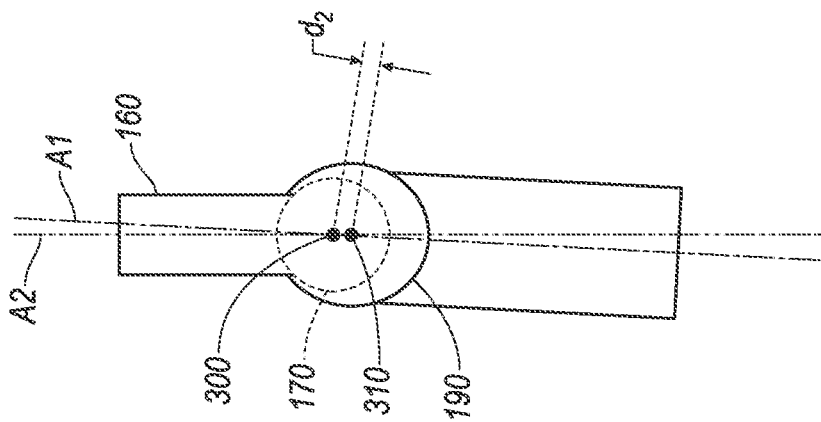
FIG. 3B
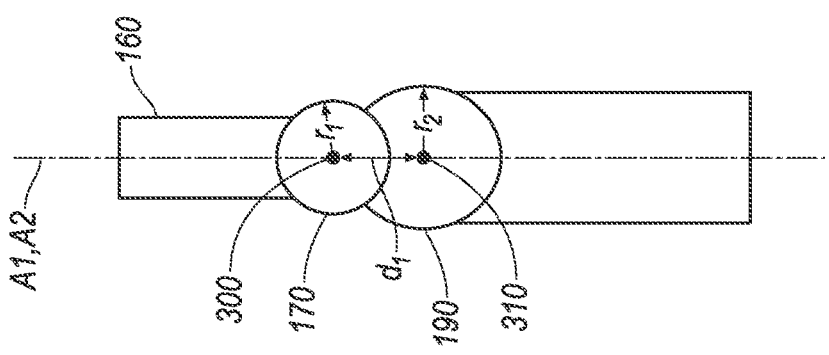
FIG. 3A
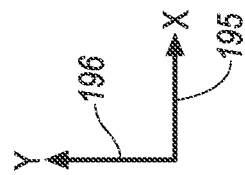

HITCHING MANEUVER

RELATED APPLICATION

This application claims priority to provisional U.S. patent application No. 62/751,948, filed Oct. 29, 2018, entitled HITCHING MANEUVER, which application is hereby incorporated herein by reference in its entirety.

BACKGROUND

A vehicle computer can use data received from vehicle sensors such as radar, cameras, etc., to detect objects around the vehicle and determine locations of the detected objects. A computer may operate the vehicle in an autonomous, semi-autonomous, or non-autonomous mode based on determined locations of one or more objects around the vehicle. However, it can be difficult to perform a hitching procedure, including locating and/or maneuvering a hitch ball and a trailer hitch to hitch a vehicle and a trailer.

BRIEF DESCRIPTION OF THE DRAWINGS

FIG. 3A is a top view of the vehicle hitch spaced away from a trailer tongue.

FIG. 3B is a top view of the vehicle hitch and the trailer in an aligned state.

DETAILED DESCRIPTION

Introduction

Figure 1:
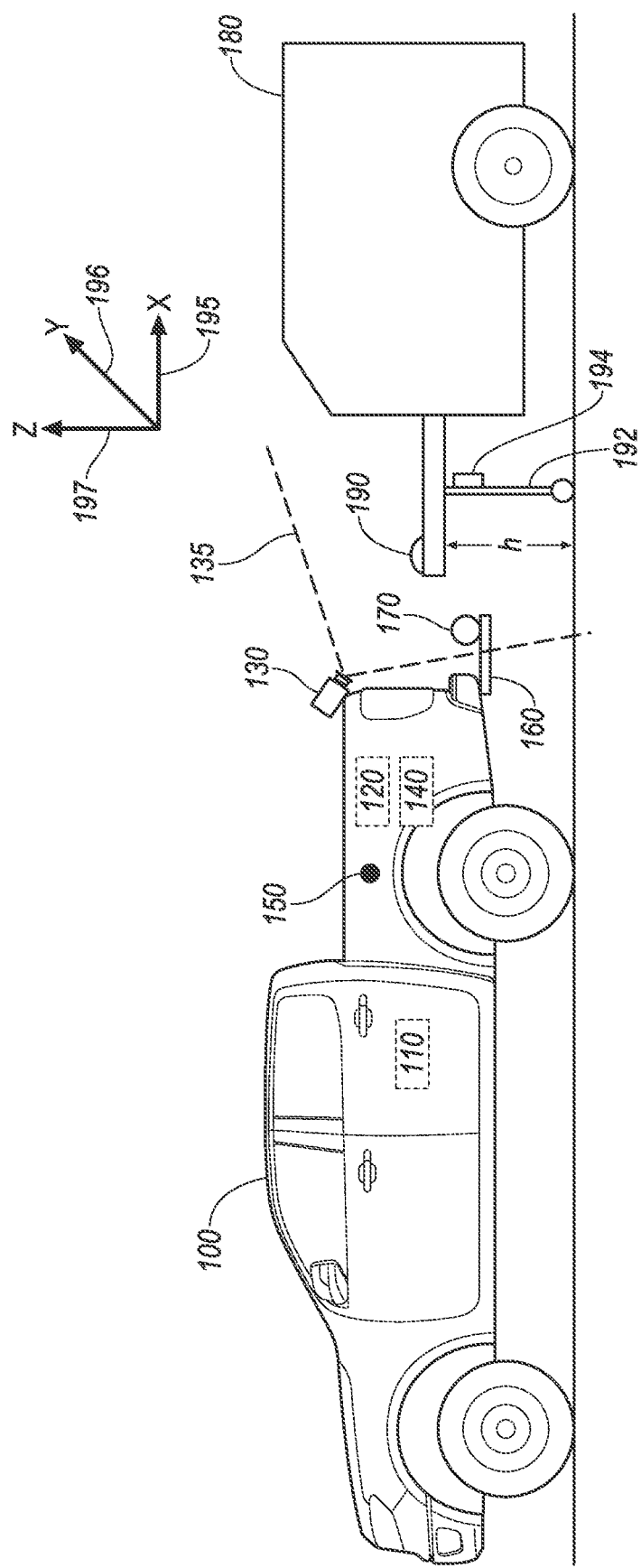
FIG. 1 is a diagram of an example vehicle and a trailer.

Disclosed herein is a computer comprising a processor and a memory. The memory stores instructions executable by the processor to, upon initiation of a trailer-hitching procedure, obtain image data of an area that is in a horizontal plane with respect to a vehicle and behind the vehicle, the area including a trailer hitch mounted to, and extending rearwardly from, the vehicle, wherein a vehicle hitch ball is mounted to the vehicle hitch, to locate the hitch ball in the image data, to define, within the area, an overshoot zone having a length extending from a vehicle rear bumper to a nearest point on the vehicle hitch ball and having a width that is a sum of a diameter of the hitch and two times a lateral offset, to define, within the area, a misaligned zone that has a border extending a misaligned zone length from the vehicle rear bumper to a line tangent to a rearmost point of the hitch ball, and to cause a vehicle action upon determining that a trailer coupling is detected in the overshoot zone or the misaligned zone, the action including at least one of updating a display, actuating a vehicle actuator to stop the vehicle, and actuating a vehicle actuator to restart a hitching maneuver.

The instructions may further include instructions to define the overshoot zone and the misaligned zone includes defining an initial overshoot zone and an initial misaligned zone according to stored data, and then to define the overshoot zone and the misaligned zone by updating the initial overshoot zone and the initial misaligned zone based on the image data.

The instructions may further include instructions to detect the trailer coupling based on an output of a trailer coupling classifier, wherein the trailer coupling classifier is trained based on data including a plurality of trailer shapes and a plurality of trailer coupling shapes, and, upon determining that the trailer coupling is within a specified distance of the hitch ball, to initiate the trailer-hitching procedure.

The instructions may further include instructions to determine that the trailer coupling is in the misaligned zone or the overshoot zone based on longitudinal and lateral location coordinates of the trailer coupling.

The instructions may further include instructions to define, within the area, an aligned zone that is an area including a center point of the vehicle hitch ball and that shares two borders with the misaligned zone and one border with the overshoot zone, and a fourth border of the aligned zone is tangent to the rearmost point of the hitch ball, and, upon determining that the trailer coupling is the aligned zone, to continue tracking a movement of the trailer coupling.

The instructions may further include instructions to, upon determining based on the obtained image data whether a trailer coupling height from a ground surface is less than a hitch ball height from the ground surface, to actuate the vehicle actuator to stop the vehicle.

The instructions may further include instructions to determine the lateral offset based on comparing a yaw angle to a yaw angle threshold for hitching, wherein the yaw angle is an angle between a first longitudinal axis of a vehicle hitch bar and a second longitudinal axis of the trailer and the yaw angle threshold is a maximum operable yaw angle that is mechanically feasible while the trailer coupling and the hitch ball are mechanically coupled.

The instructions may further include instructions to determine the lateral offset based on a multiplier determined based on a trigonometric function of the yaw angle threshold.

The instructions may further include instructions to, upon determining at least one of (i) receiving a stop request from a vehicle user interface, (ii) receiving a brake actuation request, or (iii) receiving a stop command from autonomous hitching controller, actuate the vehicle to stop and ending a tracking of the vehicle hitch.

The instructions may further include instructions to determine that the trailer coupling is in one of the misaligned zone and the overshoot zone upon determining that a projection point of a trailer coupling reference point on the horizontal plane is in within the respective zone and a height of the trailer coupling reference point from a ground surface is greater than a respective projection point height from the ground surface.

The instructions may further include instructions to cause the vehicle to stop upon determining that the trailer coupling is detected in the overshoot zone, and to output a message to a user interface upon determining that the trailer coupling is detected in the misaligned zone.

The instructions to define the misaligned zone may further include instructions to define a right misaligned zone on a right side of the overshoot zone and a left misaligned zone on a left side of the overshoot zone.

Further disclosed herein is a method, comprising upon initiation of a trailer-hitching procedure, obtaining image data of an area that is in a horizontal plane with respect to a vehicle and behind the vehicle, the area including a trailer hitch mounted to, and extending rearwardly from, the vehicle, wherein a vehicle hitch ball is mounted to the hitch, locating the hitch ball in the image data, defining, within the area, an overshoot zone having a length extending from a vehicle rear bumper to a nearest point on the vehicle hitch ball and having a width that is a sum of a diameter of the hitch and two times a lateral offset, defining, within the area, a misaligned zone that has a border extending a misaligned zone length from the vehicle rear bumper to a line tangent to a rearmost point of the hitch ball, and causing a vehicle action upon determining that the trailer coupling is detected in the overshoot zone or the misaligned zone, the action including at least one of updating a display, actuating a vehicle actuator to stop the vehicle, and actuating a vehicle actuator to restart a hitching maneuver.

The method may further include determining that the trailer coupling is in the misaligned zone or the overshoot zone based on longitudinal and lateral location coordinates of the trailer coupling.

The method may further include defining, within the area, an aligned zone that is an area including a center point of the vehicle hitch ball and that shares two borders with the misaligned zone and one border with the overshoot zone, and a fourth border of the aligned zone is tangent to the rearmost point of the hitch ball, and upon determining that the trailer coupling is the aligned zone, continuing tracking a movement of the trailer coupling.

The method may further include determining the lateral offset based on comparing a yaw angle to a yaw angle threshold for hitching, wherein the yaw angle is an angle between a first longitudinal axis of a vehicle hitch bar and a second longitudinal axis of the trailer and the yaw angle threshold is a maximum operable yaw angle that is mechanically feasible while the trailer coupling and the hitch ball are mechanically coupled.

The method may further include determining the lateral offset based on a multiplier determined based on a trigonometric function of the yaw angle threshold.

The method may further include, upon determining at least one of (i) receiving a stop request from a vehicle user interface, (ii) receiving a brake actuation request, or (iii) receiving a stop command from autonomous hitching controller, actuating the vehicle to stop and ending a tracking of the vehicle hitch.

The method may further include determining that the trailer coupling is in one of the misaligned zone and the overshoot zone upon determining that a projection point of a trailer coupling reference point on the horizontal plane is in within the respective zone and a height of the trailer coupling reference point from a ground surface is greater than a respective projection point height from the ground surface.

The method may further include causing the vehicle to stop upon determining that the trailer coupling is detected in the overshoot zone, and outputting a message to a user interface upon determining that the trailer coupling is detected in the misaligned zone.

Further disclosed is a computing device programmed to execute any of the above method steps.

Yet further disclosed is a computer program product, comprising a computer readable medium storing instructions executable by a computer processor, to execute any of the above method steps.

Exemplary System Elements

A computer may operate a vehicle by controlling components such as propulsion, steering, and/or braking. A vehicle may be coupled to an object, e.g., a trailer, and operate while mechanically connected to the object. The vehicle computer is programmed to operate the vehicle, based on vehicle sensor data, to align a vehicle component, e.g., a hitch, with an object component, e.g., a hitch coupler, to mechanically couple the vehicle and the object.

FIG. 1 illustrates a vehicle 100 and an object, e.g., a trailer 180. The vehicle 100 may be powered in a variety of ways, e.g., with an electric motor and/or internal combustion engine. The vehicle 100 may be a land vehicle such as a car, truck, etc. A vehicle 100 may include a computer 110, actuator(s) 120, sensor(s) 130, and a human machine interface (HMI) 140. The vehicle 100 can have a reference point 150, e.g., a geometrical center where a longitudinal axis and a lateral axis of a vehicle 100 body intersect. The vehicle 100 may include a hitch 160 for mechanically coupling the vehicle 100 to the trailer 180.

A trailer 180 may include a body and two or more wheels. The trailer 180 may include a conventional hitch coupler (or hitch tongue) 190 for mechanically coupling to the vehicle 100 hitch 160. Additionally or alternatively, the trailer 180 may include other types of mechanical attachments such as a hook or other connector, etc., to couple the trailer 180 to the vehicle 100. A trailer 180 may include a hitch jack or leg 192 to support the trailer 180, e.g., when the trailer 180 is not coupled to a vehicle 100. The trailer may further include an actuator 194 to reduce a height h of the tongue 190 from a ground surface to attach the tongue 190 to, e.g., the hitch 160 ball 170. The actuator 194 may include an electrical motor, gears, etc. Additionally or alternatively, the trailer 180 may be mechanically coupled to the vehicle 100 via securing means such as a latch lever, a screw, a padlock, etc. In the present context, a trailer 180 is mechanically coupled to a vehicle 100 when the trailer 180 is secured to the vehicle, e.g., with a securing means, such that the trailer 180 can pivot relative to the vehicle 100 but will move forward and backward when moved by the vehicle 100. The vehicle 100 hitch 160 may be mechanically couplable to a trailer 180 via a hitch 160 ball 170 and/or any other mechanical connection. In one example, the hitch 160 ball 170 may be pivotably coupled with a trailer 180 hitch tongue 190, as discussed with respect to FIG. 2.

The computer 110 includes a processor and a memory such as are known. The memory includes one or more forms of computer-readable media, and stores instructions executable by the computer 110 for performing various operations, including as discussed herein.

The computer 110 may operate the vehicle 100 in an autonomous or a semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle 100 brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle 100 communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network that can include a bus in the vehicle such as a controller area network (CAN) or the like, and/or other wired and/or wireless mechanisms.

Via the vehicle 100 network, the computer 110 may transmit messages to various devices in the vehicle 100 and/or receive messages from the various devices, e.g., an actuator 120, a sensor 130, an HMI 140, etc. Alternatively or additionally, in cases where the computer 110 actually comprises multiple devices, the vehicle 100 communication network may be used for communications between devices represented as the computer 110 in this disclosure. Further, as mentioned below, various controllers and/or sensors may provide data to the computer 110 via the vehicle communication network.

The actuators 120 can actuate various vehicle subsystems in accordance with appropriate control signals and typically include circuits, chips, and/or other electronic components. For instance, the actuators 120 may include one or more relays, servomotors, etc. The actuators 120, therefore, may be used to control braking, acceleration, and steering of the vehicle 100. The control signals used to control the actuators 120 may be generated by the computer 110, a controller, a control unit located in the vehicle 100, e.g., an electronic control unit (ECU) such as a brake controller, etc. The vehicle 100 may include various components or sub-systems, each including one or more sensors 130, actuators 120, controllers, etc. For example, the vehicle 100 may include a brake component including brake sensors 130, brake actuators 120, and/or other electronic, mechanical, etc. elements that stop the vehicle 100 based on commands received from a controller such as the computer 110. As another example, the vehicle 100 may include a powertrain component or sub-system that may include one or more actuators 120, sensors 130, etc., in addition to an engine, electric motor, and/or a transmission.

The sensors 130 may include a variety of devices to provide data to the computer 110. For example, the sensors 130 may include object detection sensors 130a, 130b such as Light Detection And Ranging (LIDAR) sensor(s) 130a, 130b, camera sensor(s) 130a, 130b, radar sensor(s) 130a, 130b, etc., disposed in and/or on the vehicle 100 that provide relative locations, sizes, shapes of other objects such as other vehicles. Additionally or alternatively, the vehicle 100 may include motions sensors 130 such as steering wheel sensor 130, speed sensor 130, etc. that provide one or more physical attributes of the vehicle 100 such as a steering angle, speed, etc.

As shown in FIG. 1, the vehicle 100 may include one or more sensors 130 mounted facing toward a rear of the vehicle 100 with fields of view 135. Such rear-facing sensors 130 may be radar, LIDAR, and/or camera sensors 130. The object detection sensors 130 may be mounted to a rear, front, and/or a side of the vehicle 100 exterior.

The HMI 140 may be configured to receive user input, e.g., during operation of the vehicle 100. As one example, an HMI 140 may include touchscreens, buttons, knobs, keypads, microphone, and so on for receiving data from a user. Moreover, an HMI 140 may include various interfaces such as a touchscreen display, a smart phone, etc., for receiving data from a user and/or outputting data to the user. For example, the computer 110 may receive a request of auto-hitching the vehicle 100 to a trailer 180. In the present context, "auto-hitching" includes an autonomous operation of the vehicle 100 to at least align a vehicle 100 hitch 160 to the trailer 180 hitch tongue 190. Additionally, "auto-hitching" may include, upon aligning the vehicle 100 hitch 160 and trailer 180 hitch tongue 190, actuating a vehicle 100 actuator 120 and/or a trailer 180 actuator 194 to mechanically couple the vehicle 100 and the trailer 180.

The computer 110 may be programmed to identify and classify an object, e.g., using image processing techniques. In one example, the computer 110 may store class description data describing various classifications pertaining to one or more of vehicles, trailers, trucks, bicycles, etc. The stored classification description data may include data associated with each respective type, i.e., classification, of object. For example, the stored classification description data of each object type may include typical dimensions, shape, etc. of the respective object. For example, the classification or type of trailer 180 may include dimensions and shapes of trailer 180. The classification or type description data may further include typical shape of hitch tongue 190. Additionally or alternatively, the classification description data may include typical location of a target area, e.g., a tongue 190, or point on each type of object. For example, the classification description of the trailer 180 may identify a point on an end of a hitch tongue 190. Thus, the computer 110 may be programmed to identify the trailer 180 based on the stored classification description and the received sensor data. For example, the computer 110 may be programmed to ignore a detected bicycle, upon determining that a request to attach the vehicle 100 to a trailer 180 is received, e.g., via the HMI 140.

Figure 2:
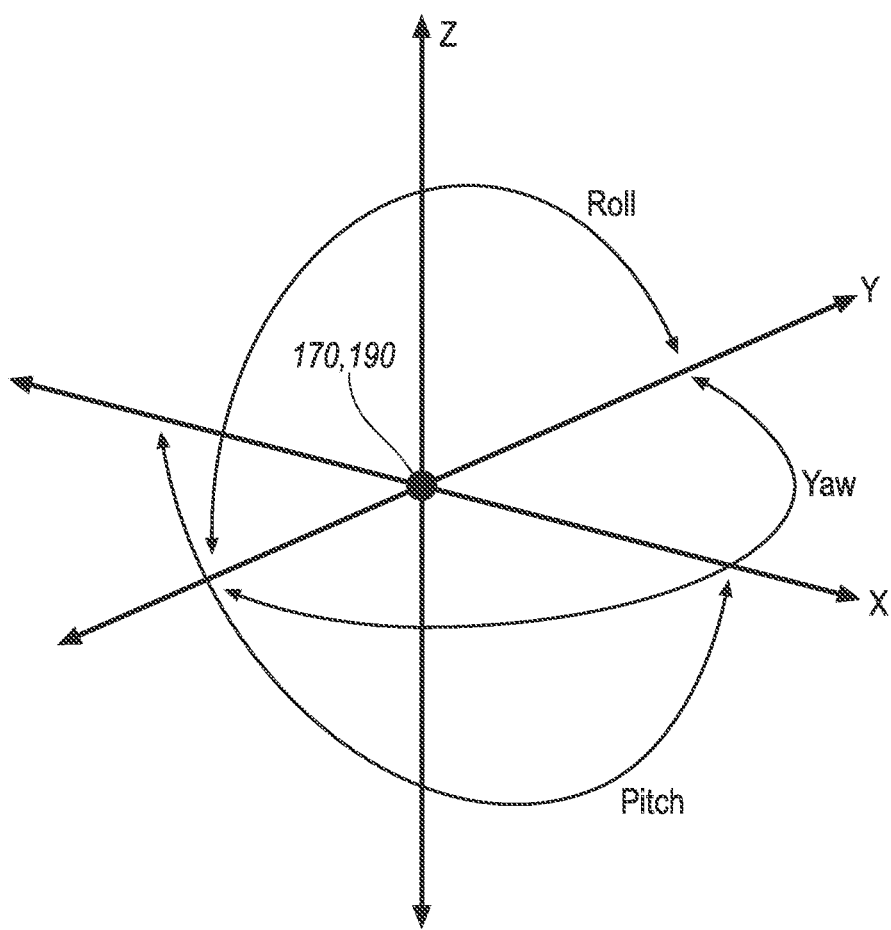
FIG. 2 is a perspective view of a vehicle hitch and trailer coupling (or tongue) of FIG. 1 with example orientation vectors superimposed thereon.

With reference to FIG. 2, an orientation of a component such as a hitch 160, a tongue 190, etc., includes a current roll, pitch, yaw, and/or vertical position of the component. The vehicle 100 may include an orientation sensor 130 including chips and/or mechanical components. An orientation of the vehicle 100 to a reference such as ground level includes a scalar three-dimensional vector with a specified origin, e.g., at the vehicle 100 reference point 150, indicating a direction of the vehicle 100 relative to a reference three-dimensional coordinates system, e.g., a global reference point. For example, the orientation may include an algebraic sum, such as is known, of various independent vectors, each indicating a direction of the vehicle relative to a respective reference direction, e.g., a pitch, a yaw, and a roll of the vehicle 100. Additionally or alternatively, the orientation may include a three-dimensional vector including longitudinal, lateral, and vertical x, y, z coordinates with reference to the X, Y, Z axes 195, 196, 197.

Table 1 below shows example data specifying location and orientation of a component, e.g., a hitch 160, a tongue (or coupling 190). With reference to Table 1 and FIG. 2, a first and second orientation of a vehicle 100 hitch 160 and a trailer 180 tongue 190 may be specified as (yaw$_h$, roll$_h$, pitch$_h$) and (yaw$_t$, roll$_t$, pitch$_t$) respectively. The computer 110 may be programmed to determine the first and second orientations (yaw$_h$, roll$_h$, pitch$_h$), (yaw$_t$, roll$_t$, pitch$_t$) based on vehicle 100 sensor 130 data. The computer 110 may be programmed to determine the first orientation (yaw$_h$, roll$_h$, pitch$_h$) of the hitch 160 based on data received from vehicle 100 sensors 130, e.g., vehicle orientation sensor 130, yaw rate sensor 130, etc., and data stored in a computer 110 memory, e.g., specifying an orientation of the hitch 160 relative to the vehicle 100. The computer 110 may be programmed to determine the vehicle 100 hitch 160 location x$_h$, y$_h$, z$_h$ relative to the X, Y, Z axes 195, 196, 197 by localizing the vehicle 100 based on GPS sensor 130, LIDAR sensor 130 data, etc.

TABLE 1

| Parameter | Description |
| --- | --- |
| x | Longitudinal coordinate |
| y | lateral coordinate |
| z | elevation coordinate |
| yaw | an angle of rotation about Z axis with an origin at a component reference point. |
| roll | an angle of rotation about X axis with an origin at a component reference point |
| pitch | an angle of rotation about Y axis with an origin at a component reference point |

The computer 110 may be programmed to determine trailer 180 tongue 190 location coordinates ($x_t$, $y_t$, $z_t$) relative to the X, Y, Z axes 195, 196, 197 and/or second orientation (yaw$_t$, roll$_t$, pitch$_t$) based on data received from the vehicle 100 sensors 130, e.g., camera sensor 130, LIDAR sensor 130, etc.

To facilitate hitching a vehicle 100 and a trailer 180, the hitch 160 ball and the trailer 180 tongue 190 should reach an aligned state. An example hitching or coupling technique is discussed below with respect to FIGS. 3A-3B and 4A-4C. FIGS. 3A-3B show a top view of the hitch 160 and the tongue 190. FIG. 3A shows the hitch 160 in a not-aligned state or misaligned state (e.g., a distance $d_2$ between a hitch 160 ball 170 reference point 300 and a tongue 190 reference point 310 with respect to the longitudinal and lateral coordinates ($x_t$, $y_t$), ($x_h$, $y_h$) exceed a ball 170 radius $r_1$. The reference points 300, 310 may be geometrical center points of a circular-shaped ball 170 and/or tongue 190. FIG. 3B shows the hitch 160 and tongue 190 in an "aligned" state. In the present context, "aligned" means a distance $d_2$ between a hitch 160 ball reference point 300 and a tongue 190 reference point 310 with respect to the longitudinal and lateral coordinates ($x_t$, $y_t$), ($x_h$, $y_h$) (i.e., irrespective of elevations $z_t$, $z_h$) is less than a distance threshold, e.g., a radius $r_1$ of the ball 170, and the elevations $z_t$, $z_h$ allow a hitching action. In the present context, "a hitching action" means inserting, clicking, and/or securing the hitch 160 ball 170 to the tongue 190. Based on a shape of the hitch 160 ball 170 and tongue 190 a movement substantially along the Z axis 197 may be warranted. For example, a tongue 190 may have an opening at a bottom of the tongue 190 for inserting the ball 170 into the tongue 190. Thus, in an aligned state, an elevation $z_t$ of the tongue 190 will exceed an elevation $z_h$ of the ball 170. For example, a trailer 180 actuator 194 may be actuated to reduce the elevation $z_t$ of the tongue 190 to attach the vehicle 100 to the trailer 180. Alternatively, based on relative shapes of the hitch 160 and the trailer 180 tongue 190, in an aligned state, the elevation $z_t$ of the tongue 190 may be less than an elevation $z_h$ of the hitch 160, e.g., when the tongue 190 shall be pushed upward (away from the ground surface) to attach the tongue 190 and the hitch 160.

Additionally, a successful hitching of the vehicle 100 and the trailer 180 may be further dependent on the first and second orientations (yaw$_h$, roll$_h$, pitch$_h$), (yaw$_t$, roll$_t$, pitch$_t$) of the hitch 160 and the tongue 190. In one example, with reference to equations (1)-(3), in an aligned state a difference between orientations (yaw$_h$, roll$_h$, pitch$_h$), (yaw$_t$, roll$_t$, pitch$_t$) of the hitch 160 and the tongue 190 may be less than a threshold.

$$|yaw_h - yaw_t| < yaw_{thresh} \quad (1)$$

$$|roll_h - roll_t| < roll_{thresh} \quad (2)$$

$$|pitch_h - pitch_t| < pitch_{thresh} \quad (3)$$

Figure 4C:
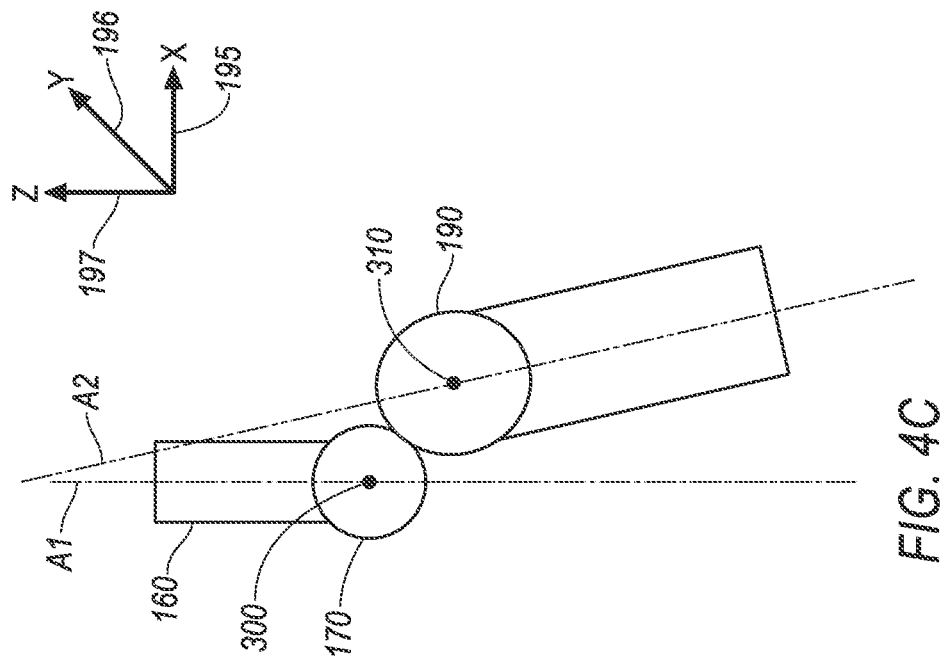
FIGS. 4A-4C show multiple examples of a misaligned vehicle hitch and trailer coupling.
Figure 4B:
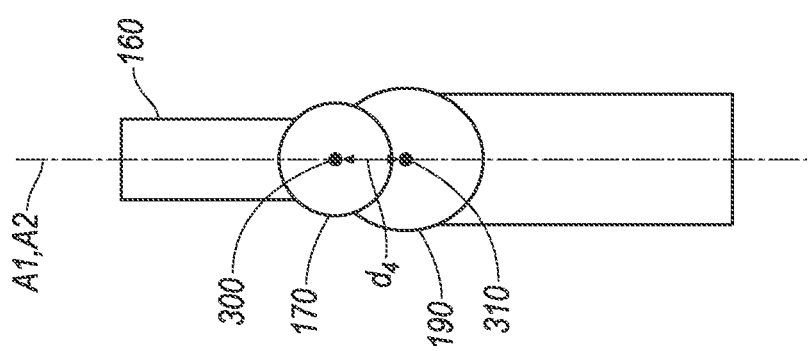
Figure 4A:
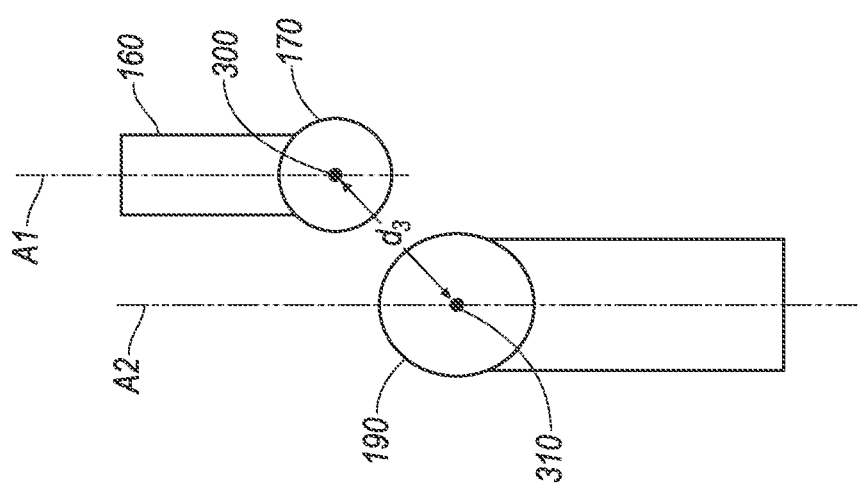

FIGS. 4A-4C shows multiple example misaligned states of the hitch 160 and the tongue 190. FIG. 4A shows an example misalignment, in which a distance $d_3$ of the reference points 300, 310 of the hitch 160 ball 170 and the tongue 190 exceed a threshold, e.g., the radius $r_1$. As shows in FIG. 1A, longitudinal axes A1, A2 of the hitch 160 and the tongue 190 are parallel, however the hitch 160 and the tongue 190 are misaligned due to the distance $d_3$ exceeding a distance threshold.

FIG. 4B shows the distance $d_4$ less than a distance threshold. However, the hitch 160 and the tongue 190 are misaligned because the elevation $z_h$ of the hitch exceeds the elevation $z_t$ of the tongue 190. As discussed above, the tongue 190 may have an opening at a bottom of the tongue 190. Thus, the hitch 160 ball 170 cannot be attached to the tongue 190 by a movement along the Z axis 197 when the ball 170 is higher than the tongue 190.

FIG. 4C shows an example misalignment, in which a difference between the orientations (yaw$_h$, roll$_h$, pitch$_h$), (yaw$_t$, roll$_t$, pitch$_t$) of the hitch 160 and the tongue 190 may be greater than a threshold yaw$_{thresh}$, roll$_{thresh}$, pitch$_{thresh}$. For example, the differences between the yaw values yaw$_h$ and yaw$_t$ may exceed the threshold yaw$_{thresh}$. A misalignment may be a combination of one or more of (i) distance $d_1$ exceeding the threshold, (ii) a difference of orientations (yaw$_h$, roll$_h$, pitch$_h$), (yaw$_t$, roll$_t$, pitch$_t$) exceeds a threshold yaw$_{thresh}$, roll$_{thresh}$, pitch$_{thresh}$, and/or (iii) a height mismatch, e.g., when the elevation $z_t$ of a tongue 190 with an opening at the bottom is less than an elevation $z_h$ of the ball 170.

The computer 110 may be programmed to operate, including controlling a movement of, the vehicle 100, e.g., by actuating a steering, braking, and/or propulsion actuator 120 to move the vehicle 100 hitch 160 to a location of the tongue 190 of the trailer 180. In one example, the location of the tongue 190 is specified by location coordinates ($x_t$, $y_t$, $z_t$) of a reference point 310, e.g., a geometrical center of the tongue 190. Further, the location of the hitch 160 may be specified by location coordinates $x_h$, $y_h$, $z_h$ of a reference point 300, e.g., a geometrical center of the ball 170. The orientations (yaw$_h$, roll$_h$, pitch$_h$), (yaw$_t$, roll$_t$, pitch$_t$) may be specified with respect to the reference points 300, 310.

The computer 110 may be programmed to navigate the vehicle 100 such that the vehicle 100 hitch 160 reaches an aligned state, i.e., is aligned with the tongue 190. In one example, the computer 110 may be programmed to identify a path, e.g., a curved path, from a current location of the vehicle 100 hitch to the determined location of the tongue 190 and to actuate the vehicle 100 actuators 120 to navigate the vehicle 100 on the identified path to move the hitch 160 to the location of the tongue 190. Thus, the computer 110 may be programmed to operate the vehicle 100 based on the location coordinates of the tongue 190 and the vehicle 100 hitch 160 relative to the vehicle 100 reference point 150. The computer 110 may be programmed to resolve a misalignment by determining a maneuver, e.g., including pulling forward and moving in the reverse direction, based on the determined orientation of the tongue 190 and the hitch 160.

Many factors such as a road pitch or grade difference between the vehicle 100 location and the trailer 180 location can lead to a misalignment at an end phase of a hitching maneuver. In the present context, an end phase of a maneuver may include any movement of the vehicle 100 when a distance $d_1$ of the reference points 300, 310 is less than a threshold, e.g., 1 meter. Various techniques are disclosed herein to surmount the misalignment problem in a hitching maneuver.

In one example technique, the computer 110 may be programmed based on a machine learning technique to determine location coordinates ($x_h$, $y_h$, $z_h$), ($x_t$, $y_t$, $z_t$) of the hitch 160 and the tongue 190. For example, the computer 110 may be programmed to determine initial condition(s) of the vehicle 100 hitch 160 and the trailer 180 based at least on one or more image frames received from camera sensor 130, LIDAR sensor 130, etc., to detect the object prior to the autonomous hitch process. The detection of the trailer 180 may be performed in one or more frames near the end phase of the hitching maneuver. After the initial detection of the trailer 180 using machine learning techniques, the computer 110 may be programmed to perform object tracking to update the location coordinates and/or orientations of the hitch 160 and the tongue 190.

A machine learning technique may include a (i) traditional machine learning technique such as histogram of gradient (HOG), support vector machine (SVM), etc., and (ii) deep learning technique such as R-CNN, YOLO, etc. Deep learning techniques typically require more computing resources (e.g., a volume of used memory, a number of computational cycles, etc.) compare to traditional machine learning techniques. However, deep learning techniques may provide more robust results compared to traditional machine learning techniques.

To detect the vehicle 100 hitch 160, the computer 110 may be programmed to detect the ball 170 based on stored location of the ball 170 relative to the vehicle 100, e.g., reference point 150. The computer 110 may be programmed to perform image processing in a specified region of interest where the hitch 160 ball 170 may be located. In one example, an area of interest may be a volume, e.g., a spherical volume, centered at stored location of the reference point 300 and a radius, e.g., 10 centimeters.

Additionally, the computer 110 may be programmed to detect the hitch 160 ball 170 based on integral image data. In the present context, "integral image data" is defined as image data with pixel values averaged over a period of time, e.g., 1 second, and/or a number of frames, e.g., 50. The integral image may resolve varying light condition problem during object detection and may cancel image noise that may result in misdetection of, e.g., a round ball 170. The computer 110 may be further programmed to detect the hitch 160 ball 170 based on stored input received from the HMI 140, e.g., location, shape, color, etc. of the ball 170.

Detecting the trailer 180 tongue 190 may be more challenging compared to detecting the hitch 160 ball 170, at least because the trailer 180 location may change relative to the vehicle 100 and/or may have various shapes and/or constructions. An algorithm to detect the tongue 190 may be based on various assumptions: (i) an approximate position of the tongue 190 can be estimated upon entering the end phase of autonomous hitch maneuver, and (ii) an appearance of the tongue 190 in the received sensor 130 data may not experience a significant affine deformation during the end-phase.

Because the location of the tongue 190 is not stationary, in contrast to ball 170 detection, a fixed region of interest cannot be specified. However, the computer 110 may be programmed to utilize optical flow techniques to align the region of interest around the trailer 180 tongue 190 (e.g., updating a location of a volume centered at current estimated reference point 310).

As another example, the computer 110 may be programmed to detect a marker, e.g., a bar code, a QR code, a logo, etc., on the trailer 180 tongue 190 and determine the location of the tongue 190 based on determined location of the marker. The computer 110 may store data, e.g., image data, of one or more markers that may be found on a tongue 190. The computer 110 may be programmed to detect the market using pattern recognition techniques based on known (stored) pattern of the marker. Additionally or alternatively, the computer 110 may be programmed to detect the tongue 190 based on a signal received from a beacon or image data including a blinking LED (Light Emitting Diode) mounted to the tongue 190. In yet another example, multiple beacons may be mounted in specified locations of the trailer 180 may improve a detection of location and/or orientation of the tongue 190.

As another example, the computer 110 may be programmed to detect the trailer 180 tongue 190 based on a stored template of the trailer 180 using a template matching technique. A robust approach for template matching may involve a detection of a set of image features in a template and computing descriptor of the detected features. A similar procedure is applied to the camera sensor 130 image data. A correlation between the template features and camera image features is determined with descriptor matching followed by image classification.

In another example, the computer 110 may be programmed to detect the location ($x_t$, $y_t$, $z_t$) and/or orientation ($yaw_t$, $roll_t$, $pitch_t$) of the tongue 190 using three-dimensional (3D) point cloud measurement approach based on sensor 130 data received from multiple sensors 130, e.g., LIDAR sensor 130, radar sensor 130, etc. For example, using a 3D point cloud of an area surrounding the vehicle 100, the computer 110 may be programmed to 3D structural clues for object detection and alignment analysis (i.e., determining whether the hitch 160 and tongue 190 are in an aligned state). The computer 110 may detect a foreground object in the field of view 135 when a point height of background object is provided. If there is a foreground object inside the field of view 135, the computer 110 may apply 3D structure analysis to verify whether the foreground object is the target.

With respect to various example techniques discussed above to detect hitch 160 and/or the tongue 190, the computer 110 may be programmed to detect the hitch 160 and the tongue 190, and to determine a maneuver for hitching the vehicle 100 to the trailer 190 using a combination of the above discussed techniques. A combined solution may include a machine learning technique and a traditional image processing technique. For example, the computer 110 may detect the hitch 160 with traditional image processing techniques and may detect the tongue 190 based on a machine learning technique.

The vehicle 100 may include multiple sensors 130, e.g., multiple camera sensors 130, LIDAR sensors 130, etc. The computer 110 may be programmed to detect the hitch 160 and/or the tongue 190 using sensor data fusion techniques.

In one example, the vehicle 100 may include multiple camera sensors 130. Upon determining that both the tongue 190 and the hitch 160 are within the fields of view 135 of two camera sensors 130, the computer 110 may be programmed to determine a relative 3D pose between the hitch 160 and the tongue 190. Such a 3D pose may advantageously enable the computer 110 to determine a hitching maneuver for a complex alignment scenario in which a maneuver of the vehicle 100 for hitching based on 2D data has failed, e.g., upon a collision of the hitch 160 and the tongue 190, a misalignment in elevation $z_t$, $z_h$, etc.

Although physical configuration and fundamental principles of a radar sensor 130 operation may prevent a precise measurement of the tongue 190 location in a close range, e.g., within 1 meter from the hitch 160, still based on a positive measurement of the tongue 190 initial location, combined with image tracking, vehicle kinematic model, and/or odometry measurement, the computer 110 may be programmed, based in part on radar sensor 130 data, to propagate and estimate the tongue 190 location using the sensor fusion algorithm such as Kalman Filter, Unscented Filter, Particle filter etc.

As discussed above with reference to FIGS. 3A-3B, the distances $d_1$, $d_2$ may be in a 2D plane. The computer 110 may be programmed based on assuming that a distance between the reference points 300, 310 in a 3D space (actual distance) is proportional to the determined distances d1, d2 in a 2D space. Due to the unknown hitch 160 and tongue 190 height in an image plane, the artifacts introduced from camera sensor 130 pin hole projection, and/or a non-orthogonal orientation between camera sensor 130 and tongue 190, an alignment state determined based on 2D image data may not necessary indicate the alignment in the 3D coordinates.

The area of intersection of a bounding box (determined imaginary box surrounding the detected object) or a circle area defined around the tongue 190 and the hitch 160 may indicate a degree of alignment, i.e., a positive alignment occurs when a substantial portion, e.g., 90%, of a tongue bounding box area is inside the hitch 160 bounding box.

Figure 5:
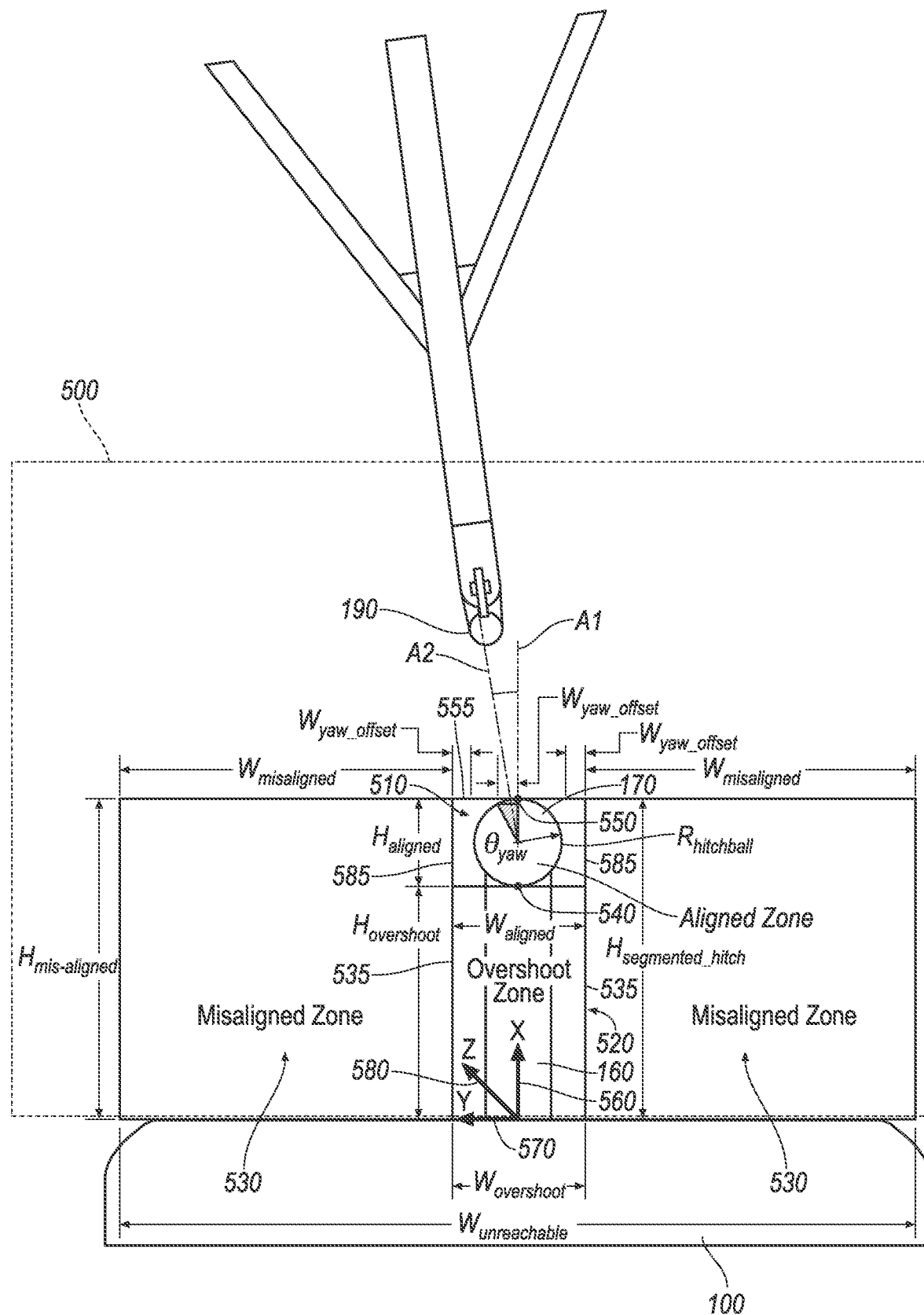
FIG. 5 is a top view of the vehicle hitch with misaligned, overshoot, and aligned zones superimposed thereon.

Another example hitching maneuver technique is discussed below with respect to FIGS. 5 and 6A-6C. FIG. 5 is a top view of the vehicle 100 hitch 160 with superimposed misaligned, overshoot, and aligned zones 510, 520, 530. As discussed below, the vehicle 100 may be actuated during a hitching maneuver based on a location of a trailer coupling 190 relative to the zones 510, 520, 530.

The computer 110 can be programmed, upon initiation of a trailer-hitching procedure, to obtain image data of an area 500 that is in a horizontal plane with respect to a vehicle 100 and behind the vehicle 100, the area 500 including a trailer hitch 160 mounted to, and extending rearwardly from, the vehicle 100. The horizontal plane is a plane substantially parallel to a ground surface and extending away from the vehicle 100 bumper parallel to a vehicle 100 hitch bar 160 axis A1. The area 500 is a portion of the horizontal plane that is within a field of view of the vehicle 100 sensor(s) 130, e.g., a field of view of a rear-view camera sensor 130.

A hitch ball 170 is mounted to the hitch 160. The computer 110 can be programmed to locate the hitch ball 170 in image data (as discussed further below) from a camera sensor 130, and to define, within the area 500, an overshoot zone 520. An overshoot zone 520, in the present context, is an area within the area 500 having a length $H_{overshoot}$ and a width $W_{overshoot}$. The length $H_{overshoot}$ extends from a vehicle 100 rear bumper to a nearest point 540 on the vehicle 100 hitch ball 170, as specified in Equation (4). The width $W_{overshoot}$ is a sum of a diameter $2R_{Hitchball}$ (i.e., two times a radius) of the hitch ball 170 and two times a lateral offset $W_{yawoffset}$, as specified in Equation (5). As discussed below with reference to Equation (8), the lateral offset $W_{yawoffset}$ is determined as a magnitude of length along a Y axis 570 that is parallel to a vehicle 100 lateral axis.

$$H_{overshoot} = H_{segmented\_hitch} - 2R_{Hitchball} \quad (4)$$

$$W_{overshoot} = 2R_{Hitchball} + 2 W_{yawoffset} \quad (5)$$

The computer 110 can be programmed to define, within the area 500, a misaligned zone 530 that extends a length, i.e., has a border 535 extending the length $H_{misaligned}$ from the vehicle 100 rear bumper to a line 555 tangent to a rearmost point 550 of the hitch ball 170. In one example, the computer 110 may be programmed using image segmentation techniques to determine a length $H_{segmented\_hitch}$ of the hitch 160 including the ball 170. Image segmentation is a computational process of partitioning a digital image into multiple segments with a goal of simplifying and/or changing the representation of an image into data, i.e., sets of pixels, that is more meaningful and easier to analyze. An image segmentation process, in this example, may output coordinates of a bounding box enclosing (i.e., each edge of the box touching at least a point on the perimeter of) the hitch 160 and the hitch ball 170 relative to the X, Y axes 560, 570. With reference to Equation (6) and FIG. 5, the computer 110 may determine the length $H_{misaligned}$ to be same as the length $H_{segmented\_hitch}$, which can be determined based on the determined coordinates of the bounding box enclosing the hitch 160 and the hitch ball 170.

$$H_{misaligned} = H_{segmented\_hitch} \quad (6)$$

As shown in FIG. 5, the computer 110 may be programmed to define a right misaligned zone 530 on a right side of the overshoot zone 520 and a left misaligned zone 530 on a left side of the overshoot zone 520. Right and left, in the present context, are specified with reference to the Y axis 570, e.g., "right" means having a y coordinate within the positive y coordinate range and "left" means having a y coordinate within the negative y coordinate range. The computer 110 may be programmed, in accordance with Equation (7), to determine a width $w_{misaligned}$ of the misaligned zone 530 based on a width $W_{unreachable}$ and the width $W_{overshoot}$. The width $W_{unreachable}$ is total width of an area within the field of view of the vehicle 100 sensor(s) 130 that includes the overshoot zone 520 and also an area that is not suitable to mechanically couple the trailer coupling 190 and the hitch ball 170. "Not suitable" in this context means when the trailer coupling 190 is in an area in which the hitch ball 170 and the trailer coupling 190 may not be couplable, and therefore the coupling 190 is specified as misaligned. For example, the width $W_{unreachable}$ may be 50 centimeter (cm), 1 meter (m), etc.

$$W_{misaligned} = \frac{W_{unreachable} - W_{overshoot}}{2} \quad (7)$$

The computer 110 can be further programmed to cause a vehicle 100 action upon determining that a trailer coupling 190 is detected in the overshoot zone 520 or the misaligned zone 530. "Being in a zone" is defined further below.

In the present context, a trailer-hitching procedure can be a non-autonomous, semi-autonomous, or autonomous maneuver of a vehicle 100 to move the vehicle 100 such that the trailer hitch coupling 190 is located in an aligned zone 510, as defined below. The computer 110 may be programmed to initiate (or actuate) a hitching procedure upon detecting a trailer coupling 190 based on the data obtained from the vehicle 100 sensor(s) 130, e.g., a rear-camera sensor 130. In another example, the computer 110 may be programmed to initiate a hitching procedure upon detecting a trailer coupling 190 and determining that the trailer coupling 190 is within a specified distance, e.g., 3 meters (m), to the vehicle 100 hitch ball 170.

Different trailer 180 hitch couplings 190 may have different shapes. Shapes and designs may differ based on different models and/or manufacturers of hitch coupling(s) 190. For example, a trailer 180 may be an open utility trailer 180, a boat trailer 180, a camping (RV) trailer 180, etc. The hitch coupling 190 may have different types of mechanical support beams shaped in different forms, e.g., triangular (as shown in FIG. 5), etc. Various techniques may be used to detect a trailer hitch coupling 190, and a shape thereof, based on obtained image data. In one example, the computer 110 may be programmed to detect a trailer coupling 190 based on an output of a trailer coupling classifier. The trailer coupling classifier may be a Neural Network (NN) that is trained based on data including a plurality of trailer 180 shapes and a plurality of trailer coupling 190 shapes. For example, a trailer coupling classifier CNN (convolutional neural network) may be trained based on training data including images of a plurality, e.g., fifty, different types of trailers 180 and trailer couplings 190.

A CNN is a software program that can be implemented on a computing device that can be trained based on input of an image of a vehicle 100. A CNN includes a plurality of convolutional layers that extract hidden features from an input image of a vehicle 100 which are passed to a plurality of fully-connected layers that transform the hidden features into a vehicle 100 pose. The CNN is trained by inputting an image of a vehicle 100 captured by, e.g., the camera sensor 130, and backpropagating results to be compared with the ground truth data to determine a loss function. Training the CNN includes determining parameters for convolutional and fully-connected layers that minimize the loss function. When trained, a CNN may output (i) whether a trailer coupling 190 is detected within image data received from the vehicle 100 sensor(s) 130, and (ii) upon determining that a trailer coupling 190 is within the image, outputting location data of the trailer coupling 190, e.g., 3D coordinates relative to the axes 560, 570, 580.

The computer 110 may be programmed to end the hitching procedure, upon determining that the hitching-procedure is completed. The computer 110 may be programmed to determine that the hitching-procedure is completed, upon at least one of (i) receiving a stop request from a vehicle 100 user interface, (ii) receiving a brake actuation request from the vehicle 100 user interface, or (iii) receiving a stop command from autonomous hitching controller, to actuate the vehicle 100. The computer 110 may be programmed to end the hitching procedure by ending a tracking of the vehicle 100 hitch 160 and the trailer coupling 190.

As discussed above, the width $W_{overshoot}$ is in part determined based on the lateral offset $W_{yawoffset}$. The computer 110 may be programmed to determine the lateral offset $W_{yawoffset}$ based on a yaw angle threshold $\theta_{thresh}$ for hitching. In the present context, a yaw angle $\theta_{yaw}$ is an angle between a longitudinal axis A1 of the vehicle 100 hitch bar 160 and the longitudinal axis A2 of the trailer 180. The yaw angle threshold $\theta_{thresh}$ may be a maximum operable yaw angle $\theta_{yaw}$ possible while the trailer coupling 190 and the hitch ball 170 are mechanically coupled. Based on materials and/or shape of the trailer coupling 190, a yaw angle $\theta_{yaw}$ may cause a physical damage like bending, breaking, etc., to the mechanical components of trailer coupling 190, vehicle 100 hitch 160, and/or the hitch ball 170. Thus, "maximum operable yaw angle" is a largest angle, e.g., 30 degrees, which may not result in a physical damage to a mechanical component.

The computer 110 may be programmed to determine the lateral offset $W_{yawoffset}$ based on a trigonometric function of the yaw angle threshold $\theta_{thresh}$. For example, the computer 110 may be programmed, in accordance with Equation (8), to determine the lateral offset $W_{yawoffset}$ based on yaw angle threshold $\theta_{thresh}$ and the hitch ball 170 radius $R_{hitchball}$. With reference to Equation (8), the computer 110 may determine a multiplier $\sin(\theta_{thresh})$ based on the trigonometric sin function, and may determine the lateral offset $W_{yawoffset}$ based on the multiplier $\sin(\theta_{thresh})$ and the radius $R_{hitchball}$.

$$W_{yawoffset} = \sin(\theta_{thresh}) * R_{hitchball} \quad (8)$$

With reference to Equations (9)-(10), the computer 110 may be programmed to locate the hitch ball 170 in the received image data, and to define, within the area 500, an aligned zone 510 having a length $H_{aligned}$ and a width $W_{aligned}$, that is an area including a center point of the vehicle 100 hitch ball 170 and that shares two borders 585 with the misaligned zone 530, one border 590 with the overshoot zone 520, and a fourth border 555 (or border line 555) of the aligned zone 510 is tangent to the rearmost point 550 of the hitch ball 170. Thus, an aligned zone 510 may be a rectangular area within the area 500 (i.e., on the horizontal plane) that includes a center-point of the hitch ball1 170.

$$H_{aligned} = 2 R_{hitchball} \quad (9)$$

$$W_{aligned} = W_{overshoot} \quad (10)$$

As discussed above, the computer 110 may locate the vehicle 100 hitch 160 and hitch ball 170 in the received image data. In one example, the locations of the hitch ball 170 and the hitch 160 are two dimensional (2D) location coordinates with respect to a Cartesian coordinate system including the X, Y axes 560, 570. The computer 110 may be programmed using image processing techniques including segmentation techniques employing deep learning to detect the hitch 160 and hitch ball 170, and to determine boundaries of the hitch 160 and hitch ball 170 projected on the area 500 (i.e., two dimensional projection of the hitch 160 and the hitch ball 170). A projection of a point, e.g., a reference point of the hitch ball 170, in the area 500 on the horizontal plane is a point having same x, y coordinates, but a different z (or vertical) coordinate, as the point on the hitch ball 170. Put another way, a projection of a point onto the plane in which the area 500 is defined is defined by a line perpendicular to the plane including the area 500, and including the point being projected. For example, a classifier using image processing techniques such as edge detection may be trained with images of various types of hitch 160 and hitch ball 170 to output x, y coordinates of boundaries (e.g., defining a bounding box) of the hitch 160 and hitch ball 170 on the horizontal plane (i.e., in the area 500). In one example, the computer 110 may be programmed to determine coordinates of corners of each zone relative to the X, Y axes 560, 570.

To succeed in a hitching procedure, the trailer coupling 190 needs to be in the aligned zone 510. However, the hitch 160 may move relative to the vehicle 100 body, e.g., due to a loose connection, minor bending as a result of hitting an object, etc., thus resulting in a need to adjust the location coordinates of the zones 510, 520, 530. The computer 110 may be programmed to, first, define the zones 510, 520, 520 by defining an initial zone 510, 520, 530, and then, second, define the zones 510, 520, 530 by updating the initial zones 510, 520, 530 based on the image data. For example, the computer 110 may be programmed to determine the initial zones 510, 520, 530 coordinates (e.g., 2D coordinates of corners of each zone 510, 20, 530) based on data stored in a computer 110 memory, data received from a vehicle 100 user interface device, and/or an initial image processing step, etc. The computer 110 may be programmed to iteratively or periodically process received image data using a CNN and determine 2D coordinates of the corners of the zones 510, 520, 530. The computer 110 may be programmed to update the zones 510, 520, 530 based on the determined 2D coordinates of the corners of zones 510, 520, 530.

As discussed above, the vehicle 100 may be actuated during a hitching procedure based on a location of a trailer coupling 190 relative to the defined zones 510, 520, 530, i.e., being in a zone 510, 520, 530. In the present context, "being in a zone" means a projection of the trailer coupling 190 reference point, e.g., a center-point, is in the respective zone 510, 520, 530. In other words, the trailer coupling 190 is in a zone 510, 520, 530, when a reference point of the trailer coupling 190 is above the 2D area of the respective zone 510, 520, 530. The computer 110 may be programmed to determine whether the trailer coupling 190 is in the misaligned zone 530 or the overshoot zone 520 based on longitudinal and lateral location coordinates of the trailer coupling 190. The longitudinal and lateral location coordinates of the trailer coupling 190 may be specified with respect to the axes 560, 570, 580.

The computer 110 may be programmed to determine that the trailer coupling 190 is in a zone 510, 520, 530 upon determining that a projection point of a trailer coupling 190 reference point, e.g., a center-point, on the horizontal plane is within the respective zone 510, 520, 530. Typically a trailer coupling 190 is mechanically and pivotably attached to the hitch ball 170 from a top side of the hitch ball 170. Thus, the computer 110 may be programmed to determine that the trailer coupling 190 is in a zone 510, 520, 530, upon additionally determining that a height of the trailer coupling 190 reference point, i.e., a point selected for representing the trailer coupling 190, e.g., a coupling 190 center-point, from the ground surface is greater than a height of its projection on the horizontal plane from the ground surface.

If the height of the trailer coupling 190 with reference to the Z axis 580 is less than a height of the hitch ball 170, i.e., a lesser distance along the Z axis 580, then a coupling of the hitch ball 170 and trailer coupling 190 may not succeed, i.e., secure mechanical engagement of the trailer coupling 190 and the hitch ball 170 may not be achieved. Thus, the computer 110 may be programmed to stop moving and/or halt the vehicle 100, and further may be programmed to then output a message to the vehicle 100 user interface, upon determining based on the received sensor 130 data that a trailer coupling 190 height from the ground surface is less than a hitch ball 170 height from the ground surface. The computer 110 may store a height of the hitch ball 170 in a computer 110 memory. The computer 110 may determine the z coordinate of the trailer coupling 190 reference point based on the sensor 130 data using conventional image processing techniques, e.g., based on image data received from a calibrated camera sensor 130, a LIDAR sensor 130, etc.

The computer 110 may actuate the vehicle 100 differently based on zone 510, 520, 530, in which the trailer coupling 190 is located. For example, the computer 110 may be programmed, upon determining that the trailer coupling 190 is in the aligned zone 510, to continue tracking a movement of the trailer coupling 190. Note that the vehicle 100 may move further and exit the aligned zone 510. Therefore, the computer 110 may continue tracking the trailer coupling 190, upon determining that the trailer coupling 190 is in the aligned zone 510.

The computer 110 may be programmed to cause the vehicle 100 to stop upon determining that the trailer coupling 190 is detected in the overshoot zone 530, and to output a message to a vehicle 100 user interface upon determining that the trailer coupling 190 is detected in the misaligned zone 530. A movement of the vehicle 100 while the trailer coupling 190 is in the overshoot zone 520, may cause damage to the hitch 160, vehicle 100 bumper, etc.

Figure 6A:
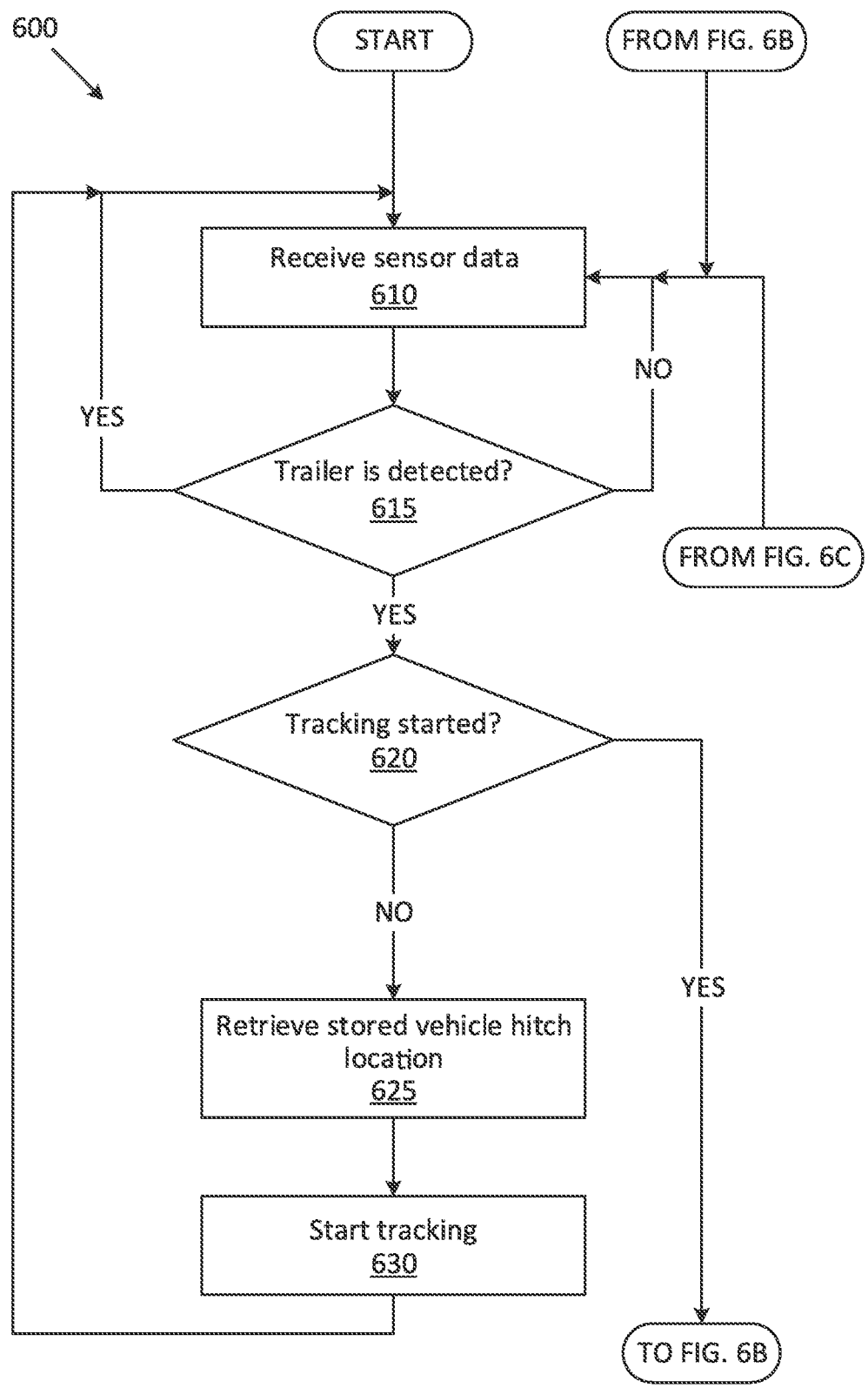
FIGS. 6A-6C are an example flowchart of an exemplary process for hitching or coupling a trailer to a vehicle.
Figure 6B:
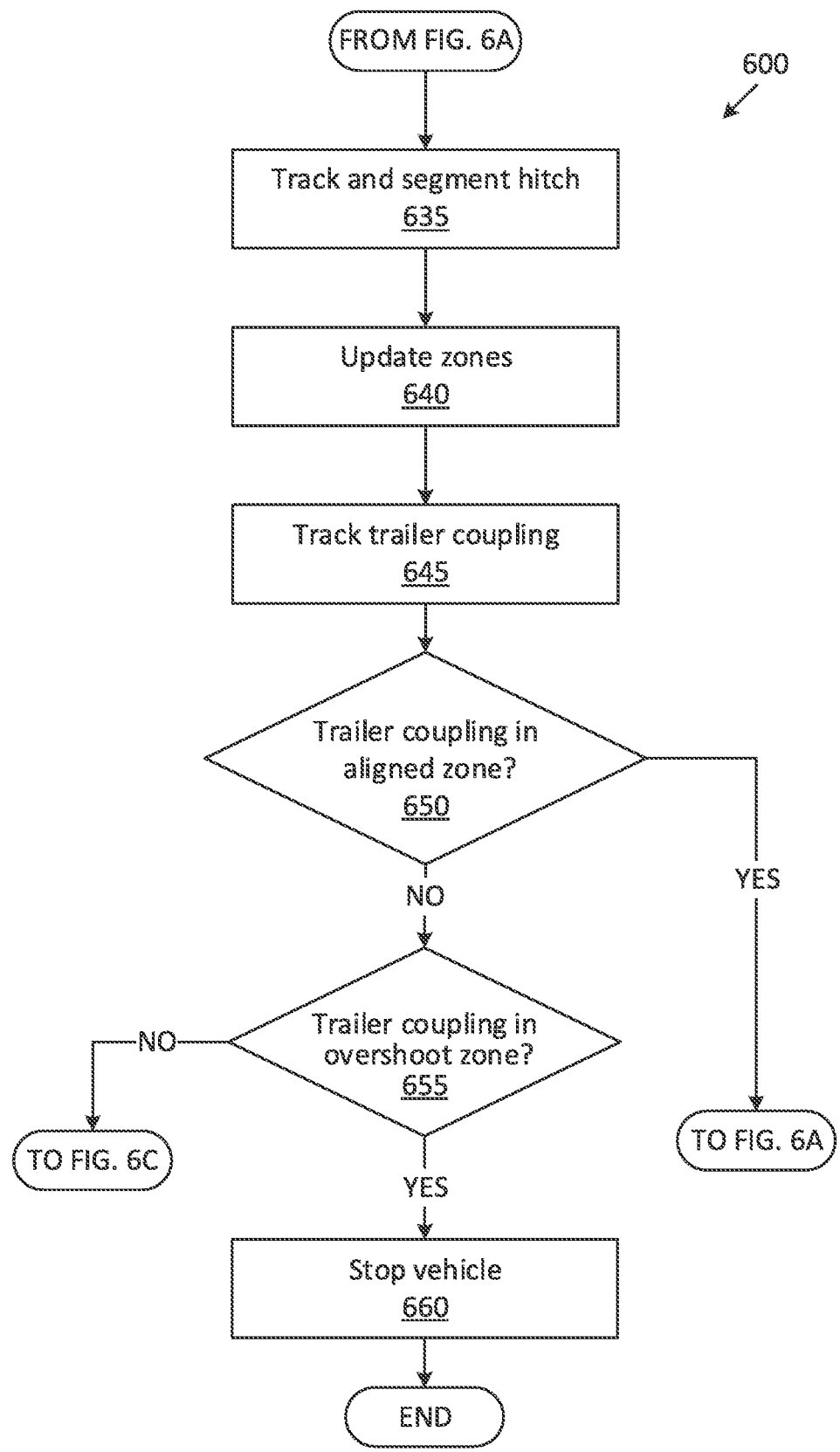
Figure 6C:
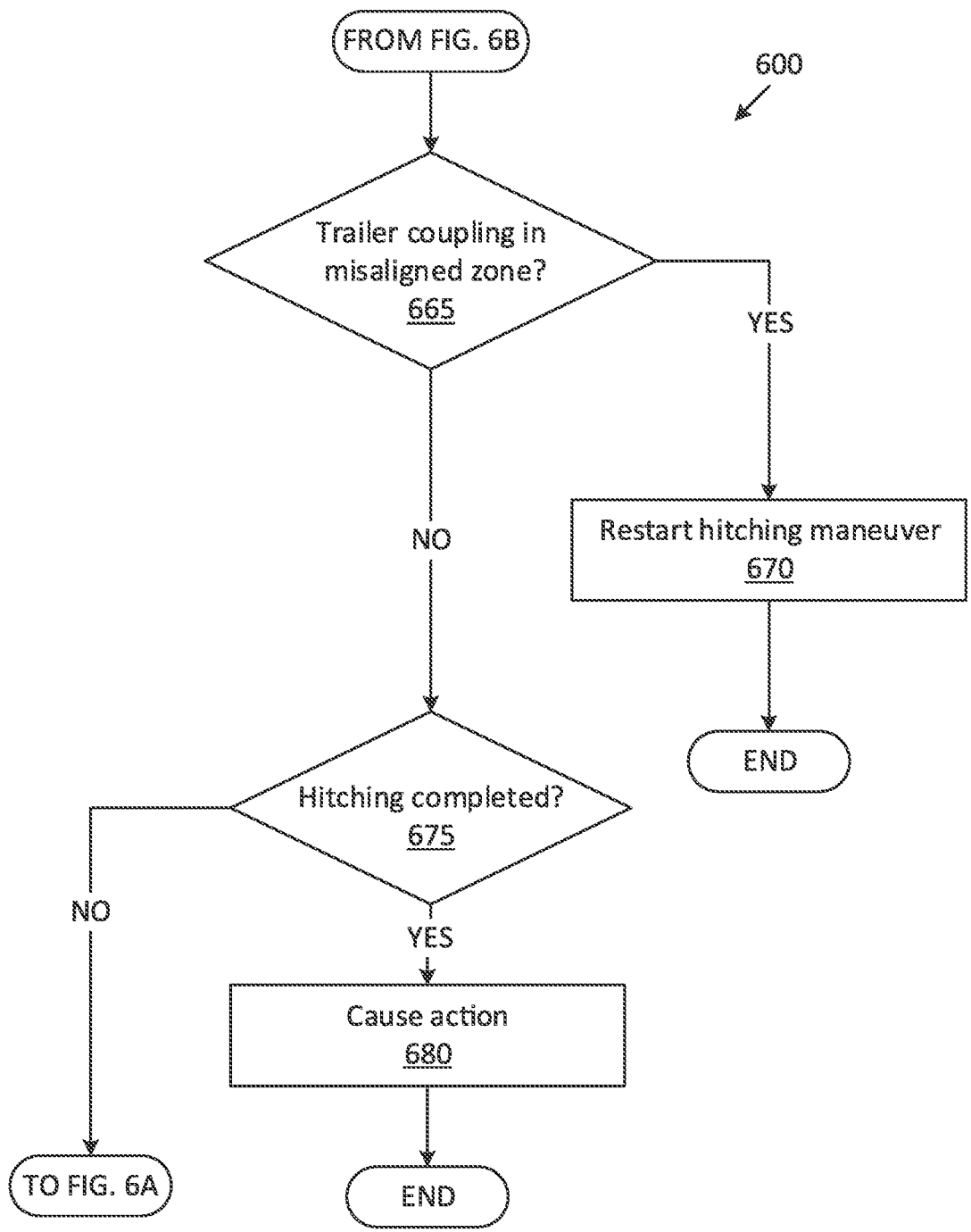

FIGS. 6A-6C show a flowchart of an exemplary process 600 for a hitching procedure. The vehicle 100 computer 110 may be programmed to execute blocks of the process 600.

With reference to FIG. 6A, the process 600 begins in a block 610, in which the computer 110 receives sensor 130 data. For example, the computer 110 may be programmed to receive image data from a rear-camera sensor 130.

Next, in a decision block 615, the computer 110 determines whether a trailer 180 is detected in the field of view of the vehicle 100 sensor 130, e.g., the rear-camera sensor 130. The computer 110 may be programmed to detect a trailer 180 and/or a trailer hitch 190 using an output of a trailer coupling 190 classifier, e.g., including a trained CNN. In another example, the computer 110 may be programmed to determine whether a distance from the trailer 190 to the hitch ball 170 (i.e., a length of a line extending from the hitch ball 170 reference point to the trailer coupling 190 reference point) is less than a distance threshold, e.g., 5 m. If the computer determines that the trailer 180 is detected, then the process 600 proceeds to a block 620; otherwise the process 600 returns to the block 610.

In the block 620, the computer 110 determines whether tracking is initiated. The computer 110 may track the hitch ball 170 using a segmentation technique, as discussed above. The computer 110 may store data in the memory indicating a status of the tracking, e.g., including one of an "initiated" state and a "not initiated" state. If the computer 110 determines that the tracking is initiated, then the process 600 proceeds to a block 635 (FIG. 6B); otherwise the process 600 proceeds to a block 625.

In the block 625, the computer 110 retrieves stored data including the vehicle 100 hitch 160 location, e.g., 2D location coordinates of corners of the bounding boxes enclosing the hitch ball 170, and/or the hitch 160. The computer 110 may then define initial zones 510, 520, 530 (e.g., initial location coordinates of corners of the zones 510, 520, 530) based on the stored location coordinates of the zones 510, 520, 530 from the previous hitching-procedure, and/or based on stored location coordinates of the hitch ball 170 and the hitch 160 using Equations (4)-(8). Alternatively, this step may be omitted, i.e., the computer 110 may be programmed to determine the zones 510, 520, 530 based on results of tracking and segmentation as discussed below, without access to stored initial data including zones 510, 520, 530 locations, hitch 160 location or dimensions, and/or hitch ball 170 location or dimensions.

In one example, the stored data may be from previous hitching procedure, in which the computer 110 determined location coordinates of the bounding boxes, as discussed below with respect to a block 675.

Additionally or alternatively, the computer 110 may be programmed to receive data including the vehicle 100 hitch 160 location from the vehicle 100 user interface. The computer 110 may be programmed to output information to the vehicle 100 user interface, e.g., a display in a vehicle 100 interior, specifying a list of necessary input data such as the location of hitch ball 170, a length of the hitch 160, dimensions of the hitch 160, distance of the hitch ball 170 from the vehicle 100 bumper, radius of the hitch ball 170, etc. A vehicle 100 user may determine the information, e.g., using a measuring tool such as a ruler or the like presented on a touchscreen of a user device, and can thus enter the measured dimensions to the vehicle 100 user interface via the touch screen.

Additionally or alternatively, the computer 110 may be programmed to determine default location coordinates of the hitch 160, hitch ball 170, etc., based on a vehicle 100 model, configuration, etc.

Next, in a block 630, the computer 110 starts tracking of hitch 160, hitch ball 170, and the trailer coupling 190, e.g., using segmentation techniques including a CNN as described above. In one example, the computer 110 may be programmed to start tracking of the hitch 160 and the hitch ball 170 based on stored data in the computer 110 memory, as discussed above. Following the block 630, the process 600 returns to the block 610.

Turning to FIG. 6B, in the block 635, the computer 110 tracks the hitch 160. The computer 110 may be programmed to track the hitch 160 and the hitch ball 170 using segmentation techniques. In one example, the computer 110 may be programmed to track the hitch 160 and hitch ball 170 based on a vehicle 100 movement, because upon vehicle 100 movement, image data from points (or pixels) in the received image which are from locations in the image other than hitch 160 and hitch ball 170 may change/move relative to the vehicle 100 (e.g., road surface changes, lane marking, etc.). Thus, the computer 110 may track a hitch 160 and hitch ball 170 by tracking points in the received images which are stationary relative to the vehicle 100 (i.e., relative to the sensor 130 because the sensor 130 is mounted to the vehicle 100). The computer 110 may be programmed to determine updated 2D location coordinates of the corners of bounding boxes enclosing the hitch 160 and the hitch ball 170.

Next, in a block 640, the computer 110 updates the zones 510, 520, 530 based on the updated 2D location coordinates of the bounding boxes, determined by the tracking and segmentation of the hitch 160 and the hitch ball 170. The computer 110 may be programmed to update the zones 510, 520, 530 based on the determined 2D location coordinates of the hitch 160 and hitch ball 170 bounding boxes using Equations (4)-(8). The computer 110 may be programmed to determine the length radius $R_{hitchball}$ and the length $H_{segmented\_hitch}$ based on the dimensions of bounding boxes enclosing the hitch 160 and the hitch ball 170. The computer 110 may store the width $W_{unreachable}$ and the yaw angle threshold $\theta_{thresh}$ in a computer 110 memory and may determine the zones 510, 520, 530 using the Equations (4)-(8), stored data, and the determined length radius $R_{hitchball}$ and the length $H_{segmented\_hitch}$. In one example, if previous values for zones 510, 520, 530 location are not known, the computer 110 may be programmed to determine the zones 510, 520, 530 based on receiving image data and performing segmentation and tracking as described above, i.e., without having information pertaining to the initial zones 510, 520, 530. In this example, the computer 110 may deactivate hitching procedure until a first set of results including segmentation of the hitch 160, hitch ball 170, etc. (e.g., coordinates of corners of the bounding boxes) are determined. For example, the computer 110 may process multiple image frames received from the sensor 130 until the hitch 160, hitch ball 170, etc., are detected in the image data.

Next, in a block 645, the computer 110 tracks the trailer coupling 190 and determines the location of the coupling 190. The computer 110 may be programmed to determine the 2D location coordinates of the trailer coupling 190 based on the received sensor 130 data using image processing techniques such as segmentation techniques. The computer 110 may be further programmed to determine a z coordinate (height, i.e., distance from a ground surface) of the trailer coupling 190 reference point based on the received sensor 130 data using image processing techniques.

Next, in a decision block 650, the computer 110 determines whether the trailer coupling 190 is in the aligned zone 510 (i.e., as discussed above, whether a projection of the trailer coupling 190 reference point on the horizontal plane is within the zone 510). If the computer 110 determines that the trailer coupling 190 is in the aligned zone 510, then the process 600 returns to the block 610 (FIG. 6A); otherwise, the process 600 proceeds to a decision block 655.

In the decision block 655, the computer 110 determines whether the trailer coupling 190 is in the overshoot zone 520 (i.e., whether a projection of the trailer coupling 190 reference point on the horizontal plane is within the overshoot zone 520). If the computer 110 determines that the trailer coupling 190 is within the overshoot zone 520, then the process 600 proceeds to a block 660; otherwise the process 600 proceeds to a decision block 665 (FIG. 6C).

In the block 660, the computer 110 actuates the vehicle 100 to stop. The computer 110 may be programmed to actuate a vehicle 100 brake actuator 120 to stop the vehicle 100. Additionally, the computer 110 may be programmed to output a message to the vehicle 100 user interface, e.g., indicating a stop of the vehicle 100 and/or a request to start over the hitching procedure. Following the block 660, the process 600 ends, or alternatively returns to the block 610, although not shown in FIGS. 6A-6B.

Turning to FIG. 6C, in the decision block 665, the computer 110 determines whether the trailer coupling 190 is in the misaligned zone 530 (i.e., whether the projection of the trailer coupling 190 reference point on the horizontal plane is in the misaligned zone 530). If the computer 110 determines that the trailer coupling 190 reference point is within the misaligned zone 530, the process 600 proceeds to a block 670; otherwise the process 600 proceeds to a decision block 675.

In the block 670, the computer 110 causes an action to restart the hitching procedure. For example, the computer 110 may output a message to the vehicle 100 user interface including a request to restart the hitching procedure. Further for example, the computer 110 may initiate a process to restart the hitching procedure by autonomously moving the vehicle 100 away from the trailer 180 and repeat a maneuver to navigate the vehicle 100 toward the trailer 180 such that the trailer coupling 190 enters the aligned zone 510. Following the block 670, the process 600 ends, or alternatively returns to the block 610, although not shown in FIGS. 6A-6C.

In the decision block 675, the computer 110 determines whether the hitching procedure is completed. As discussed above, the computer 110 may be programmed to determine that the hitching procedure is completed based on various conditions. In one example, upon determining that the hitching-procedure is completed, the computer 110 may be programmed to store the bounding box location coordinates of the hitch 160, the hitch ball 170, zones 510, 520, 530, etc., in a computer 110 memory, for use in subsequent hitching procedures as discussed above. If the computer 110 determines that the hitching procedure is completed, then the process 600 proceeds to a block 680; otherwise the process 600 returns to the block 610 (FIG. 6A).

In the block 680, the computer 110 causes an action. The computer 110 may output a message to the vehicle 100 user interface indicating completion of hitching-procedure. Additionally or alternatively, the computer 110 may be programmed to actuate the vehicle 100 brake actuator 120 to stop the vehicle 100. Following the block 680, the process 600 ends, or returns to the block 610 (FIG. 6A).

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random-access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random-access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A computer, comprising a processor and a memory, the memory storing instructions executable by the processor to:
    upon initiation of a trailer-hitching procedure, obtain image data of an area that is in a horizontal plane with respect to a vehicle and behind the vehicle, the area including a trailer hitch mounted to, and extending rearwardly from, the vehicle, wherein a vehicle hitch ball is mounted to the vehicle hitch;
    locate the hitch ball in the image data;
    define, within the area, an overshoot zone having a length extending from a vehicle rear bumper to a nearest point on the vehicle hitch ball and having a width that is a sum of a diameter of the hitch and two times a lateral offset;
    define, within the area, a misaligned zone that has a border extending a misaligned zone length from the vehicle rear bumper to a line tangent to a rearmost point of the hitch ball; and
    cause a vehicle action upon determining that a trailer coupling is detected in the overshoot zone or the misaligned zone, the action including at least one of updating a display, actuating a vehicle actuator to stop the vehicle, and actuating a vehicle actuator to restart a hitching maneuver.

2. The computer of claim 1, wherein the instructions further include instructions to:
    define the overshoot zone and the misaligned zone includes defining an initial overshoot zone and an initial misaligned zone according to stored data, and
    then define the overshoot zone and the misaligned zone by updating the initial overshoot zone and the initial misaligned zone based on the image data.

3. The computer of claim 1, wherein the instructions further include instructions to:
    detect the trailer coupling based on an output of a trailer coupling classifier, wherein the trailer coupling classifier is trained based on data including a plurality of trailer shapes and a plurality of trailer coupling shapes; and
    upon determining that the trailer coupling is within a specified distance of the hitch ball, initiate the trailer-hitching procedure.

4. The computer of claim 1, wherein the instructions further include instructions to determine that the trailer coupling is in the misaligned zone or the overshoot zone based on longitudinal and lateral location coordinates of the trailer coupling.

5. The computer of claim 1, wherein the instructions further include instructions to:
    define, within the area, an aligned zone that is an area including a center point of the vehicle hitch ball and that shares two borders with the misaligned zone and one border with the overshoot zone, and a fourth border of the aligned zone is tangent to the rearmost point of the hitch ball; and
    upon determining that the trailer coupling is the aligned zone, continue tracking a movement of the trailer coupling.

6. The computer of claim 1, wherein the instructions further include instructions to, upon determining based on the obtained image data whether a trailer coupling height from a ground surface is less than a hitch ball height from the ground surface, actuate the vehicle actuator to stop the vehicle.

7. The computer of claim 1, wherein the instructions further include instructions to determine the lateral offset based on comparing a yaw angle to a yaw angle threshold for hitching, wherein the yaw angle is an angle between a first longitudinal axis of a vehicle hitch bar and a second longitudinal axis of the trailer and the yaw angle threshold is a maximum operable yaw angle that is mechanically feasible while the trailer coupling and the hitch ball are mechanically coupled.

8. The computer of claim 7, wherein the instructions further include instructions to determine the lateral offset based on a multiplier determined based on a trigonometric function of the yaw angle threshold.

9. The computer of claim 1, wherein the instructions further include instructions to, upon determining at least one of (i) receiving a stop request from a vehicle user interface, (ii) receiving a brake actuation request, or (iii) receiving a stop command from an autonomous hitching controller, actuate the vehicle to stop and ending a tracking of the vehicle hitch.

10. The computer of claim 1, wherein the instructions further include instructions to determine that the trailer coupling is in one of the misaligned zone and the overshoot zone upon determining that a projection point of a trailer coupling reference point on the horizontal plane is within the respective zone and a height of the trailer coupling reference point from a ground surface is greater than a respective projection point height from the ground surface.

11. The computer of claim 1, wherein the instructions further include instructions to:
cause the vehicle to stop upon determining that the trailer coupling is detected in the overshoot zone; and
output a message to a user interface upon determining that the trailer coupling is detected in the misaligned zone.

12. The computer of claim 1, wherein the instructions to define the misaligned zone further include instructions to define a right misaligned zone on a right side of the overshoot zone and a left misaligned zone on a left side of the overshoot zone.

13. A method, comprising:
upon initiation of a trailer-hitching procedure, obtaining image data of an area that is in a horizontal plane with respect to a vehicle and behind the vehicle, the area including a trailer hitch mounted to, and extending rearwardly from, the vehicle, wherein a vehicle hitch ball is mounted to the hitch;
locating the hitch ball in the image data;
defining, within the area, an overshoot zone having a length extending from a vehicle rear bumper to a nearest point on the vehicle hitch ball and having a width that is a sum of a diameter of the hitch and two times a lateral offset;
defining, within the area, a misaligned zone that has a border extending a misaligned zone length from the vehicle rear bumper to a line tangent to a rearmost point of the hitch ball; and
causing a vehicle action upon determining that the trailer coupling is detected in the overshoot zone or the misaligned zone, the action including at least one of updating a display, actuating a vehicle actuator to stop the vehicle, and actuating a vehicle actuator to restart a hitching maneuver.

14. The method of claim 13, further comprising determining that the trailer coupling is in the misaligned zone or the overshoot zone based on longitudinal and lateral location coordinates of the trailer coupling.

15. The method of claim 13, further comprising:
defining, within the area, an aligned zone that is an area including a center point of the vehicle hitch ball and that shares two borders with the misaligned zone and one border with the overshoot zone, and a fourth border of the aligned zone is tangent to the rearmost point of the hitch ball; and
upon determining that the trailer coupling is in the aligned zone, continuing tracking a movement of the trailer coupling.

16. The method of claim 13, further comprising determining the lateral offset based on comparing a yaw angle to a yaw angle threshold for hitching, wherein the yaw angle is an angle between a first longitudinal axis of a vehicle hitch bar and a second longitudinal axis of the trailer and the yaw angle threshold is a maximum operable yaw angle that is mechanically feasible while the trailer coupling and the hitch ball are mechanically coupled.

17. The method of claim 16, further comprising determining the lateral offset based on a multiplier determined based on a trigonometric function of the yaw angle threshold.

18. The method of claim 13, further comprising, upon determining at least one of (i) receiving a stop request from a vehicle user interface, (ii) receiving a brake actuation request, or (iii) receiving a stop command from an autonomous hitching controller, actuating the vehicle to stop and ending a tracking of the vehicle hitch.

19. The method of claim 13, further comprising determining that the trailer coupling is in one of the misaligned zone and the overshoot zone upon determining that a projection point of a trailer coupling reference point on the horizontal plane is within the respective zone and a height of the trailer coupling reference point from a ground surface is greater than a respective projection point height from the ground surface.

20. The method of claim 13, further comprising:
causing the vehicle to stop upon determining that the trailer coupling is detected in the overshoot zone; and
outputting a message to a user interface upon determining that the trailer coupling is detected in the misaligned zone.

* * * * *